United States Patent
Johnson et al.

[11] Patent Number: 5,980,616
[45] Date of Patent: Nov. 9, 1999

[54] FILTER MEDIA FOR PREVENTING CARBON MIGRATION

[75] Inventors: Linelle R. Johnson, Bloomington; Gary L. Butler, Silver Lake; Thomas J. Bachinski, Minnetonka, all of Minn.

[73] Assignee: Donaldson Company, Inc., Minnespolis, Minn.

[21] Appl. No.: 08/911,994

[22] Filed: Aug. 15, 1997

Related U.S. Application Data

[63] Continuation of application No. 08/107,539, Aug. 17, 1993, abandoned, which is a continuation of application No. 08/017,812, Feb. 16, 1993, abandoned.

[51] Int. Cl.$^6$ .................................................. B01D 39/00
[52] U.S. Cl. .................... 96/135; 55/486; 55/514; 55/524; 55/527; 96/154; 210/491; 210/502.1; 210/505; 428/36.2; 428/74; 442/21; 442/45; 442/121; 442/393
[58] Field of Search ...................... 95/90, 91, 276, 95/285, 287; 96/118, 134, 135, 136, 147, 154; 55/315, 318, 486, 487, 524, 382, 514, 515, 519, 527, 385.6, 385.7; 428/34.6, 36.2, 69, 70, 74, 244, 246, 302; 210/502.1, 503, 505, 500.1, 491, 484; 442/21, 45, 121, 393

[56] References Cited

U.S. PATENT DOCUMENTS

| | | | |
|---|---|---|---|
| 2,591,490 | 4/1952 | Allen | 55/515 |
| 2,984,584 | 5/1961 | Glarum et al. | 428/244 |
| 3,326,810 | 6/1967 | Dolan et al. | 96/154 |
| 3,990,872 | 11/1976 | Cullen | 55/515 |
| 4,181,513 | 1/1980 | Fukuda et al. | 55/486 |
| 4,188,197 | 2/1980 | Amberkar et al. | 55/487 |
| 4,194,225 | 3/1980 | Hasler | 360/97.02 |
| 4,197,100 | 4/1980 | Hausheer | 55/486 |
| 4,217,386 | 8/1980 | Arons et al. | 428/246 |
| 4,250,172 | 2/1981 | Mutzenberg et al. | 428/234 |
| 4,272,264 | 6/1981 | Cullen et al. | 96/147 |
| 4,296,166 | 10/1981 | Ogino | 55/524 |
| 4,308,041 | 12/1981 | Ellis et al. | 55/510 |
| 4,324,574 | 4/1982 | Fagan | 55/487 |
| 4,418,369 | 11/1983 | Applequist et al. | 360/97.03 |
| 4,433,024 | 2/1984 | Eian | 428/244 |
| 4,471,395 | 9/1984 | Beck et al. | 360/98.04 |
| 4,478,620 | 10/1984 | Tamura | 55/486 |
| 4,489,356 | 12/1984 | Farmer | 369/35 |
| 4,504,290 | 3/1985 | Pontius | 96/153 |
| 4,510,193 | 4/1985 | Blücher et al. | 428/196 |
| 4,513,047 | 4/1985 | Leach et al. | 428/246 |
| 4,540,625 | 9/1985 | Sherwood | 428/283 |
| 4,581,668 | 4/1986 | Campbell | 369/72 |
| 4,594,626 | 6/1986 | Frangesh | 360/97.02 |
| 4,600,420 | 7/1986 | Wydeven et al. | 55/501 |
| 4,614,528 | 9/1986 | Lennen | 96/147 |
| 4,633,349 | 12/1986 | Beck et al. | 360/97.02 |
| 4,636,891 | 1/1987 | Barski | 360/97.02 |
| 4,642,715 | 2/1987 | Enda | 360/97.02 |
| 4,645,597 | 2/1987 | Wada | 428/244 |
| 4,657,570 | 4/1987 | Granholz et al. | 55/385.6 |
| 4,664,683 | 5/1987 | Degen et al. | 502/402 |
| 4,684,510 | 8/1987 | Harkins | 423/210 |

(List continued on next page.)

FOREIGN PATENT DOCUMENTS

| | | | |
|---|---|---|---|
| 56-13018 | 2/1981 | Japan | 96/154 |
| 64-38226 | 8/1989 | Japan | 55/486 |
| 2-241509 | 9/1990 | Japan | 96/154 |
| 3-21322 | 1/1991 | Japan | 96/154 |
| 3-229610 | 10/1991 | Japan | 96/154 |

*Primary Examiner*—Duane S. Smith
*Attorney, Agent, or Firm*—Merchant & Gould P.C.

[57] ABSTRACT

A filter includes a center layer of carbon cloth interposed between two layers of filter material whose edges are welded together to provide not only a filter edge substantially free of carbon particles, but also an effective barrier to the migration of carbon particles from the filter's interior to its exterior. A filter pouch, encapsulating the carbon filter, includes a layered structure welded together proximate its edges. The filter pouch is also suitable for use with a desiccant filter.

15 Claims, 5 Drawing Sheets

U.S. PATENT DOCUMENTS

| | | | |
|---|---|---|---|
| 4,725,904 | 2/1988 | Dalziel | 360/78.13 |
| 4,751,594 | 6/1988 | Blanks | 360/97.02 |
| 4,756,726 | 7/1988 | Peace | 55/515 |
| 4,777,549 | 10/1988 | Dushkes et al. | 360/97.03 |
| 4,816,328 | 3/1989 | Saville et al. | 428/246 |
| 4,857,087 | 8/1989 | Bolton et al. | 55/385.6 |
| 4,863,499 | 9/1989 | Osendorf | 96/134 |
| 4,877,433 | 10/1989 | Oshitari | 55/486 |
| 4,880,448 | 11/1989 | Scherrer | 96/17 |
| 4,885,652 | 12/1989 | Leonard et al. | 360/133 |
| 4,889,542 | 12/1989 | Hayes | 95/285 |
| 4,988,903 | 1/1991 | Koriyama | 310/12 |
| 5,025,336 | 6/1991 | Morehouse et al. | 360/97.02 |
| 5,029,026 | 7/1991 | Stefansky et al. | 360/97.02 |
| 5,030,260 | 7/1991 | Beck et al. | 96/139 |
| 5,034,835 | 7/1991 | Yokoyama | 360/97.02 |
| 5,069,694 | 12/1991 | Cullen et al. | 96/154 |
| 5,075,807 | 12/1991 | Inoue et al. | 360/97.02 |
| 5,081,551 | 1/1992 | Aruga | 360/97.01 |
| 5,221,573 | 6/1993 | Baigas, Jr. | 55/524 |
| 5,306,534 | 4/1994 | Bosses | 428/246 |
| 5,350,443 | 9/1994 | Von Blucher et al. | 96/135 |
| 5,417,743 | 5/1995 | Dauber | 55/385.6 |
| 5,500,038 | 3/1996 | Dauber | 96/154 |
| 5,538,545 | 7/1996 | Dauber et al. | 55/487 |

FILTER MEDIA FOR PREVENTING CARBON MIGRATION

This application is a continuation of application Ser. No. 08/107,539, filed Aug. 17, 1993, now abandoned, which is a continuation of application Ser. No. 08/017,812, filed Feb., 16, 1993, now abandoned.

TECHNICAL FIELD OF THE INVENTION

The present invention relates to the prevention of carbon migration from filter media. More particularly, a filter including a center layer of carbon cloth and method of manufacturing the filter are disclosed which retard the migration of carbon particles from the filter. A filter pouch in which the carbon filter can be placed to provide additional protection against carbon migration is also disclosed. We have also discovered that this pouch has additional applications as a desiccant filter.

BACKGROUND OF THE INVENTION

Filters employing activated carbon are used to control contaminants entering the enclosures of hard disk drives and other sensitive equipment. Activated carbon is used because of its ability to adsorb a wide variety of organic vapor contaminants entering such equipment.

The use of activated carbon as a filtering media includes, however, the problem Of preventing small particles of the carbon filtering media from migrating out of the filters themselves. This problem is of special concern because of the large numbers of small particles which accompany the use of carbon cloths used in many of the known filters. These small particles can escape from the edges of the filters and cause equipment failures, such as hard disk "crashes".

The solution to that problem is to adequately contain the carbon particles within the filter. Previous attempts at controlling carbon migration included coating the edges of filters with resins or epoxies, as well as using additional material and/or mechanical clamps to seal the filter edges. Those attempts have failed due largely to their expense and the difficulties they cause in processing such filters. As a result, no effective and economical control method exists.

SUMMARY OF THE INVENTION

The present invention includes an improved filter and method of manufacturing filters having a carbon cloth media layer. Pressure, speed and sonic energy are used to fracture the carbon cloth at the filter edges and the remaining filtering material is welded together to form edges which are both substantially free of carbon particles and which provide an effective barrier to the migration of carbon particles from the interior of the filter to its exterior, where they can contaminate the equipment the filter is meant to protect.

In the alternative, the carbon cloth can be sealed within the filter using pressure and ultrasonic energy to reform and flow polymeric materials from the surrounding filter material into the carbon cloth. After sealing, the filters are separated along the sealed edges. The polymeric material effectively binds the carbon fibers and particles at the sealed edges, thus preventing the release of particulate contaminants as discussed above.

An additional advantage is that the production trim material also has sealed edges which helps control the production of carbon particles which otherwise could contaminate the outer surfaces of the filters or cleanroom production processes.

The welding of the filter edges is preferably accomplished using ultrasonic energy, which also helps fracture the carbon cloth in the preferred methods. Also in the preferred methods and embodiments, all filter materials surrounding the carbon cloth are comprised of similar polymeric materials to provide more predictable processes due to their similar thermal and physical characteristics.

Additional protection against carbon migration from the filter media can be obtained by placing the carbon filter in a filter pouch. The filter pouch includes a first layer which is a 3-layer composite having two major sides. The first layer includes an intermediate particulate filtration layer, an outer scrim layer bonded to one side of the particulate filtration layer, and an inner scrim layer bonded on the opposite side of the particulate filtration layer. The inner scrim layer preferably has a spunbond non-woven matrix. The filter pouch also includes a second layer of spunbond non-woven matrix having a melting temperature less than the inner layer. The filter pouch finally includes a third layer having two major sides and an outer layer, intermediate layer, and inner layer functionally corresponding to the outer layer, the intermediate layer and inner layer of the first layer, respectively.

The inner layer of the first layer preferred embodiment of the pouch is disposed toward the inner layer of the third layer, and the second layer is disposed between the inner layers. The first, second and third layers can then be welded together proximate their edges to form the pouch. This is accomplished by melting the second layer into the spunbond non-woven matrix of the inner layers, preferably using ultrasonic energy.

Prior to welding the edges of the pouch, the carbon filter can be placed between the first and third layers. Alternatively, a desiccant material could be placed between the first and third layers.

DETAILED DESCRIPTION OF THE PREFERRED EMBODIMENTS

Referring now to the drawings, wherein like reference numerals designate corresponding elements throughout the views. The preferred filters of the present invention will be described first and the methods of manufacturing those filters will then be described. Then the preferred filter pouches of the present invention will be described.

Preferred Filter Edge Designs

Both of the preferred filter edge designs depicted in FIGS. 1, 2 and 2A and described in detail below provide the advantages of the present invention. The primary advantage is containment of small carbon particles and fibers in the carbon cloth while not significantly decreasing the manufacturability of the filters. As discussed above, previous attempts at sealing the edges of carbon cloth filters included coating the filter edges with resins or epoxies during manufacturing or the use of additional filter material wrapped around the edges of the filters. Those attempts increased the difficulty of manufacturing the filters, significantly added to the cost of manufacturing the filters, and did not achieve adequate contamination control for filter products manufactured using those processes.

Figure 1:
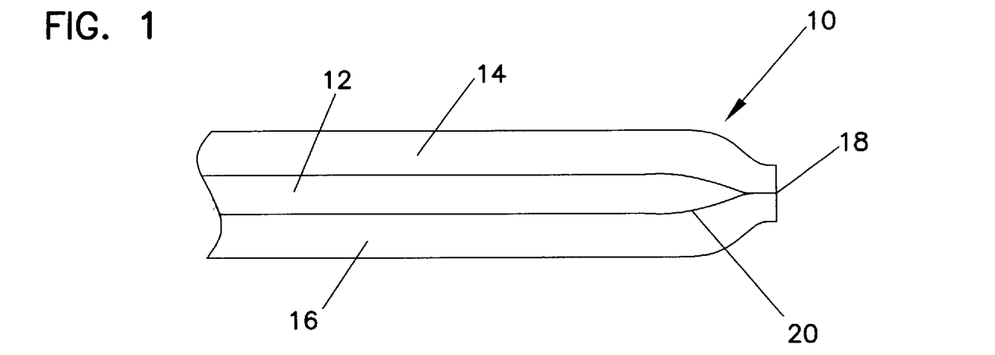
FIG. 1 is a cross-sectional view of a filter according to the present invention.

Referring to FIG. 1, a cross section of one preferred filter edge constructed in accordance with the present invention is depicted. Filter 10 includes a carbon cloth layer 12 surrounded on its two major sides by layers of filter material 14 and 16. The carbon cloth 12 has been fractured along edge 20 and the upper layer 14 and lower layer 16 of filter material have been welded together along edge 18 to provide an edge which is substantially free of carbon particles from the carbon cloth 12 and which also operates as an effective barrier to the migration of carbon particles outside for the interior of the filter.

The preferred carbon cloth is a sintered polymer-based carbon filter textile. A commercially available version is the carbon filter media matrix, KYNOL®, manufactured by Gun EI Chemical Industry Co., Ltd. Carbon media with thicknesses from 0.5 mm to 0.7 mm have been successfully edge-sealed using the present invention. The primary variables for sealing are the carbon media matrix basis weight and thickness as compared to the polymeric laminate basis weight and melt (or transition) temperatures, with process adjustments of the ultrasonic energy input, pressure of the horn on the laminate during sealing, hold time, trigger pressure, weld nest configuration, weld horn configuration, etc. It is expected that a wider variety of thicknesses can be successfully edge-sealed under the present invention, within the limits of current ultrasonic welding and materials technologies.

The preferred upper layer 14 and lower layer 16 of the filter media are a non-woven polypropylene material. They weigh 50 grams per square meter. Other filter materials such as polyesters or polycarbonates could be substituted for polypropylene. It will be understood however that the substituted material must be weldable along the edges of the filter while retaining some elasticity in order to allow easy separation of the filters or trimming of the loose material left after welding. Polypropylene is the preferred material for upper layer 14 and lower layer 16 because it reflows at a lower temperature than polycarbonate or polyester.

The selection of materials for the upper layer 14 and lower layer 16 of filter 10 is also limited because the upper and lower layers of filter material should be the same. Two types of filtering materials such as polypropylene and polycarbonate should not be mixed as the weld 18 formed by two such different layers of material would likely be of low quality due to the differences in the melting points of the different materials. It will, however, be understood that different materials can be used if their thermal and physical characteristic are sufficiently similar to provide predictable welding results.

Figure 2:
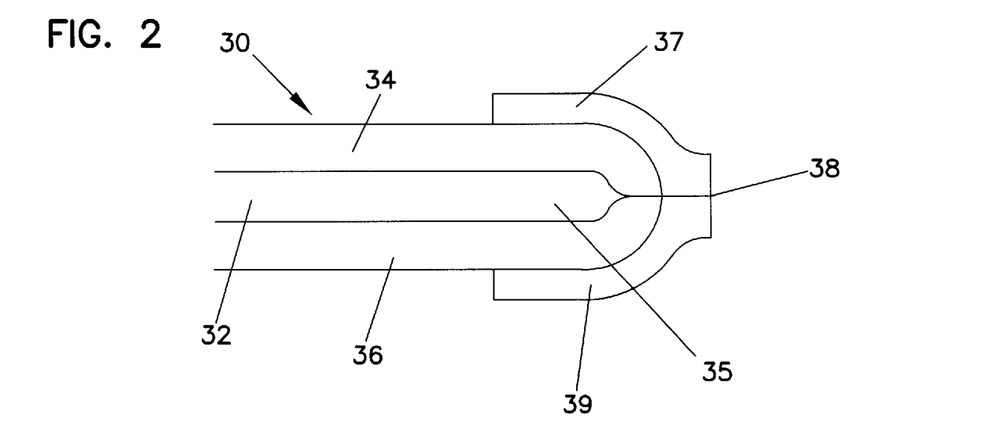
FIG. 2 is a cross section of an alternate filter according to the present invention.

An alternate preferred filter edge design is depicted in FIG. 2. The filter 30 includes carbon cloth 32 which is contained between upper layer 34 and lower layer 36 of filter material. Like the filter 10 shown in FIG. 1, carbon cloth 32 also has an edge 35 which has been formed by fracturing the carbon cloth. An additional upper layer 37 and lower layer 39 of filter material have been added to the filter 30 to provide additional filter material for welding at area 38. It will be understood that additional material could be added at only one side of the filter 30 if that would provide enough material for welding. Excess filter material in layers 37 and 39 not contained in the weld can be trimmed if desired.

Figure 2A:
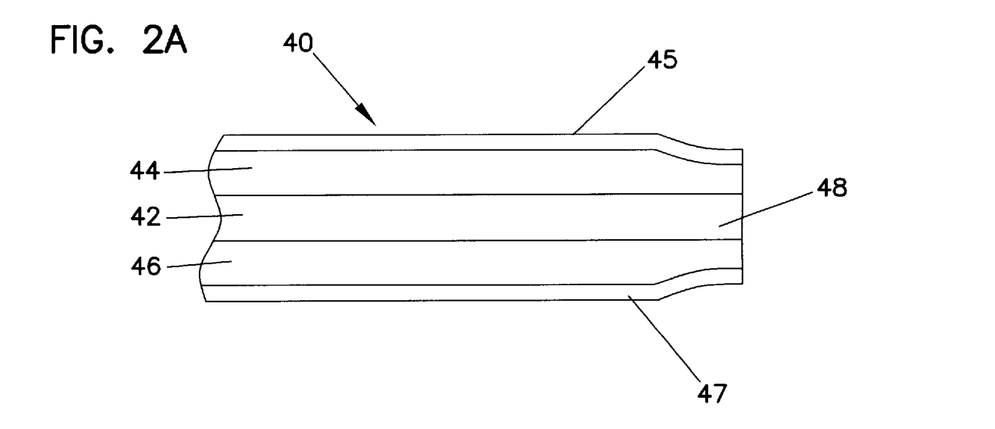
FIG. 2A is a cross section of an alternative filter according to the present invention.

An additional alternate preferred filter edge design is depicted in FIG. 2A. In that design the carbon cloth 42 in filter 40 is not fractured during the manufacturing process. Rather than fracturing the carbon cloth 42 to provide clean edges on filter 40, the upper layer 44 and lower layer 46 of filter materials are reformed and flow into the carbon cloth at edge 48 of the filter 40. If non-woven polypropylene material is preferably used for layers 44 and 46, additional polyester layers 45 and 47 can be placed on opposite sides of filter 40, as shown in FIG. 2A. The additional polyester layers are bonded proximate edge 48 to filter 40 by the reflow of polypropylene from layers 44 and 46 into layers 45 and 47, respectively. The polyester layer provides the advantage of retarding the dispersion of polypropylene fibers from layers 44 and 46. Other advantages of this design include eliminating the need to fracture the carbon cloth at the filter edge and also eliminating the need for additional polymeric material along the welded edge of the filter.

Preferred Methods of Manufacture

Methods of manufacturing filters having a carbon media according to the present invention include the use of ultrasonic welding to provide substantially improved filters which adequately contain carbon particles and fibers from the carbon cloth while also allowing clean, efficient, and economical manufacturing.

Figure 3:
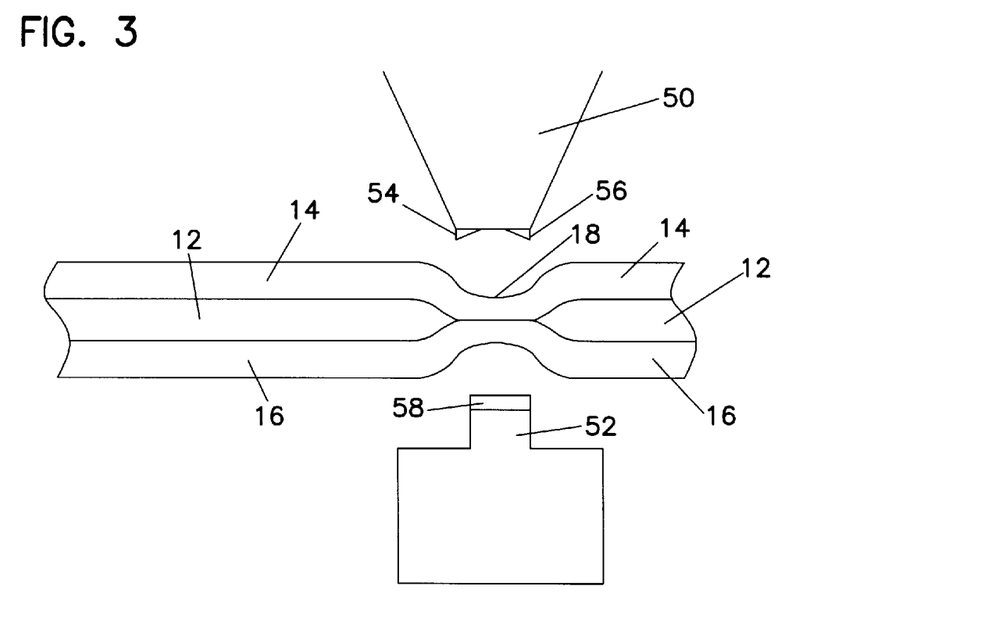
FIG. 3 is a cross-sectional view of a method of manufacturing filters according to the present invention.

One preferred method of manufacturing the filter 10 depicted in FIG. 1 can be seen in FIG. 3. As shown there, the edge of filter 10 is ultrasonically welded by welding horn 50 which is moved downward towards mandrel 52. The process begins with the alignment of the layers of filter material, carbon cloth 12, upper layer 14 and lower layer 16 between welding horn 50 and mandrel 52. Welding horn 50 is then forced downward, essentially crushing the layers of filter material between welding horn 50 and mandrel 52.

The preferred materials used are discussed above with respect to the filters themselves. As discussed there, any filter material used must be weldable along the edges of the filter while retaining some elasticity in order to allow easy separation of the filters. The welding parameters can also be adjusted to provide some flexibility in the choice of materials used in the filters and are discussed in more detail below.

Considerations that should go into selecting a filter material, other than those discussed above, include the material's ability to transmit sonic energy to the filter materials furthest away from the welding horn 50. The use of sound absorbent material and the upper layers of the filter will reduce energy transmission to the lower layers of the filter, resulting in reduced welding of the filter edge.

Also, during the ultrasonic welding process the material properties of the carbon cloth enhance its fracture at the filter edge. Specifically, the carbon cloth is (relatively) very brittle in response to sonic energy and breaks at a very low acoustical transmission level. During the welding process, a number of individual fibers are being broken in the cloth and, as the breakage continues, the energy transmission between the upper layer and lower layers of filter material increases to a level at which welding will occur between those layers of filtering material as the carbon cloth is fractured along the edge.

The pressure of the welding horn 50 on the mandrel also increases the rate at which the carbon cloth fractures, which adds to the uniformity and speed of the welding process. The force used to project welding horn 50 towards mandrel 52 to produce an acceptable edge is substantially dependent upon the type and amount of filtering material being used. The welding horn 50 is generally accelerated downward to contact the filter materials with a force of approximately 20–90 psi, depending on the type and amount of filtering material used. The primary concern in determining the amount of force to be used are the types of materials in the filter sandwich, as at least some fracturing of the carbon cloth should occur in response to the force of the welding horn striking the filter materials.

After welding horn 50 has been forced against mandrel 52 to fracture carbon cloth 12, the welding horn is activated to ultrasonically weld the upper layer 14 and lower layer 16 of filter material together along an edge of the filter. The ultrasonic welding parameters used in the preferred process include a power supply of 2000 watts at 20 kilohertz. The horn is preferably constructed of titanium. The mandrel is preferably constructed of aluminum or steel. It will be understood by those skilled in the art, that after the fracturing process has been completed other methods, such as heat sealing, may be used in place of ultra sonic welding to seal the edge of the filters according to the present invention.

Also a part of the preferred process as depicted in FIG. 3 are the use of shims 54 and 56 on the face of the welding horn 50. These shims give the transducer 50 the ability to "grab" material from the upper layer 14 and lower layer 16 of the filter and bring that material into the welding area to provide additional material to form weld 18. The use of the shims 54 and 56 is not essential to the present invention if the upper layer 14 and lower layer 16 provide enough material for welding, but does contribute to a more uniform and predictable welding process.

Also depicted in FIG. 3 is the use of a layer of low friction material 58 on welding mandrel 52. The low friction material 58 placed on the mandrel 52 provides greater isolation of the ultrasonic welding process from the mandrel 52. It is theorized that the low friction material 58 isolates the materials being welded from lateral motion during ultrasonic welding to reduce frictional heat which is the by-product of lateral motion of material over the mandrel 52. Using the low friction material 58, however, means that the energy used to create the weld comes from the vertical ultrasonic energy brought into the welding area by the transducer 50.

The low friction material cloth 58 used in the process described above along with the shims 54 and 56 are helpful in creating welds in which additional material is not provided in the welding area. If, however, additional material is provided in the welding area, then the use of low friction material and shims becomes less critical in producing satisfactory welds along the filter edge.

It will be understood that the method of manufacturing the filter 40 depicted in FIG. 2A and described above is very similar to the method described above. The primary difference is that the carbon cloth 42 in the filter 40 is not fractured during manufacturing. Rather, the edge 48 of the carbon cloth 42 is sealed by the flow of polymeric materials into the carbon cloth 42 from the layers 44 and 46 of filter material. Because the carbon cloth 42 is not fractured, the pressure and energy needed to force welding horn 50 downward against the filter materials and mandrel 52 is substantially lower than in the process where the carbon cloth layer is fractured.

Figure 4:
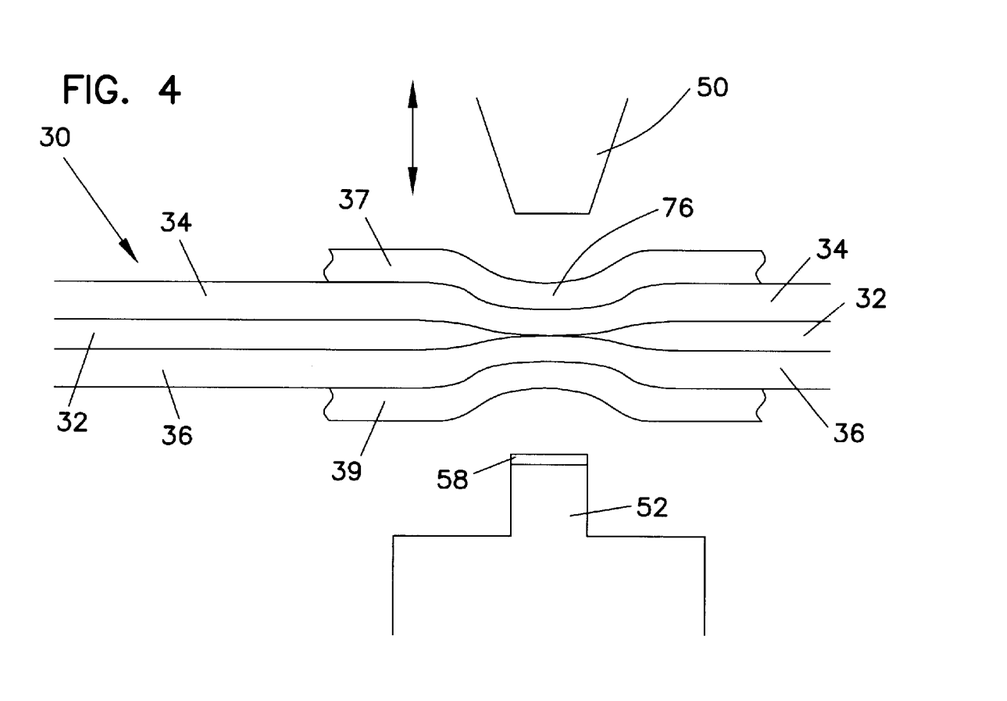
FIG. 4 is a cross-sectional view of an alternate method of producing filters according to the present invention.

FIG. 4 depicts a welding process where additional layers of material 39 and 37 are introduced into the welding area to eliminate the need for shims and low friction material. The process shown is used to manufacture the weld of the filter 30 shown in FIG. 2 and is similar to the process described above, except for the addition of the extra filter material. The additional 10 materials enhance the predictability of the welding process by providing additional material to reflow into the welded area 76 along the edge of a filter. Energy power levels supplied by the welding horn 50 as well as the force with which the horn strikes the layers of filtering material 34, 36, 37, and 39 against the mandrel 52 may need adjustment to produce an acceptable weld along the edge of the filter.

Because of the additional filter material available for welding, the shims and low friction material described with respect to the process depicted in FIG. 3 are not required to produce uniform satisfactory welds along the edge of the filter. They may, however, be used in the process depicted in FIG. 4, as they will not diminish or reduce the quality of the welds.

Figure 5:
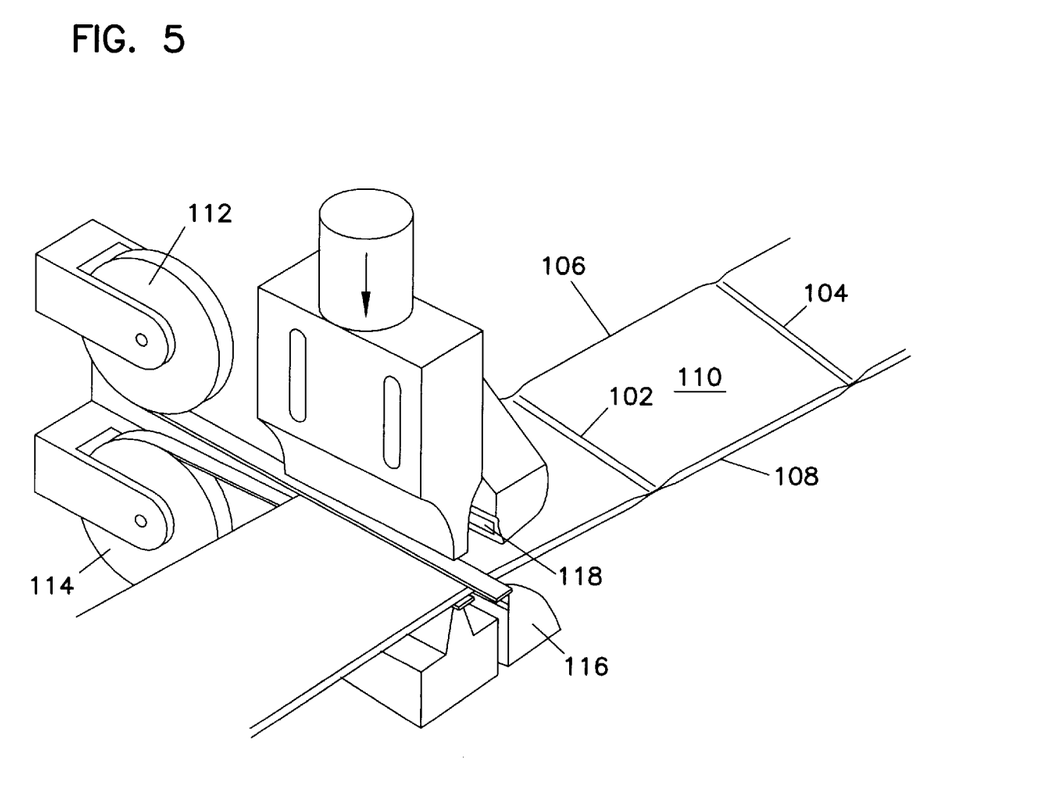
FIG. 5 is a perspective view of a preferred process of forming filters with a rectilinear shape according to the preferred embodiment.

FIG. 5 depicts the preferred embodiment and method of a rectilinear filter formed using web-fed equipment. As shown there, edges 102 and 104 of filter 110 are preferably ultrasonically welded. Those edges lie transverse to the direction of travel of the web of filter material through the machine. Edges 106 and 108 lie in the direction of travel of the webs and are sealed using standard heat sealing technology. Heat sealing technology can be used along edges 106 and 108 because the width of the carbon cloth used in filters 110 is less than the width of the filter material, thus providing an area free of carbon cloth along the edges 106 and 108 of filter 110. The filters are indexed through the machine and then separated along the ultrasonic welds.

Also depicted in FIG. 5 is the use of additional rolls 112 and 114 of filler material which unwind transverse to the machine direction. These addition rolls of filler material can be used to provide additional material to the welding area as described above.

Vacuum hoods 116 and 118 are also shown in FIG. 5. Vacuum is used to limit the possibility of loose carbon particles on the carbon cloth just prior to forming the filter sandwich. The use of vacuum is not essential, but does contribute to a uniformly cleaner end product.

Preferred Filter Pouch

Figure 6:
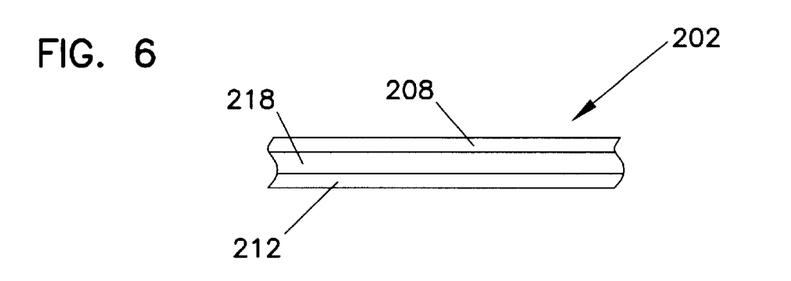
FIG. 6 is a cross-sectional view of the first layer of a filtration pouch according to the present invention.
Figure 7:
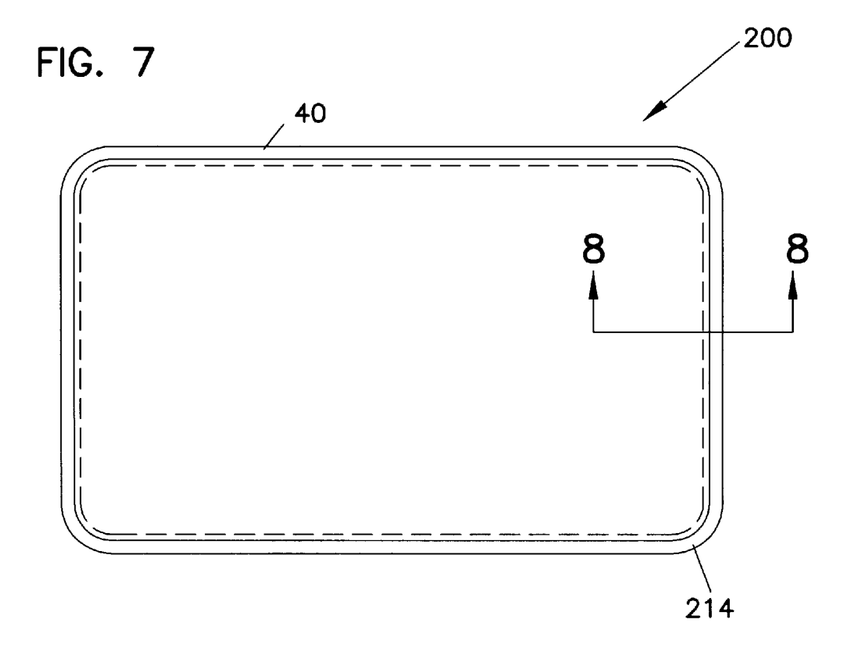
FIG. 7 is a side view of a filtration pouch containing a carbon filter according to the present invention.
Figure 8:
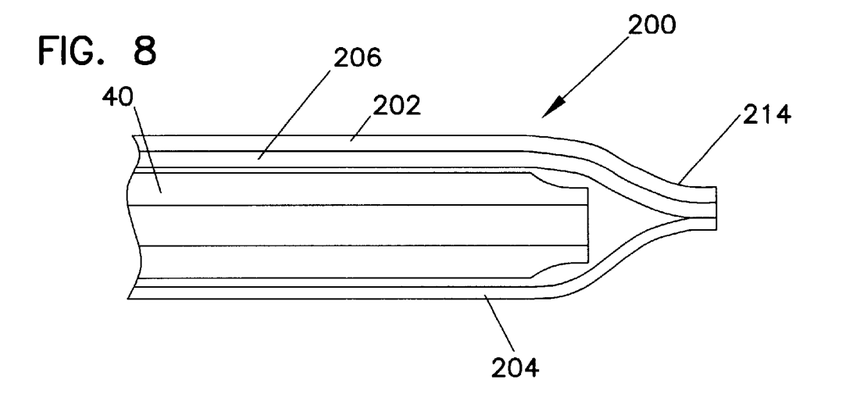
FIG. 8 is a cross-section of the pouch and carbon filter taken from FIG. 7.

We have discovered that additional protection against carbon migration away from the filters of the present invention can be obtained by placing the carbon filter in a filter pouch 200, as shown in FIGS. 6-8. FIG. 7 shows one major side of filter pouch 200 having two major sides and containing a filter 40, in accordance with the present invention. It is to be understood that carbon filters other than those disclosed herein could be placed within a similar pouch. As described below, a similar pouch can also be used to form a desiccant filter.

FIG. 8 shows a cross-section of filter pouch 200 taken from FIG. 7. The preferred filter pouch includes three principal layers. The first layer 202 is preferably similar to the third layer 204 but, as explained below, they need not be identical. The second layer 206 is disposed between first layer 202 and third layer 204.

FIG. 6 shows a cross-section of first layer 202, which as mentioned above is preferably similar to third layer 204. First layer 202 is preferably a 3-layer composite including two scrim support layers on either side of a layer designed for particulate filtration. An outer layer 208 can be any suitable fabric (spunbond, woven, non-woven) or extruded polymeric non-woven which can be bonded to adjacent intermediate layer 210 by lamination processes known by those skilled in the art, such as adhesive or thermal bonding. Outer layer 208 functions primarily as protection and support for intermediate layer 210 which is primarily responsible for particle filtration. Examples of acceptable fabric for outer layer 208 include Filtration Sciences REEMAY® or HOLLYTEX® non-woven spunbond polyester having a basis weight of approximately 2.0 oz/sq yd or less. Applied extrusions DELNET® non-woven extruded polypropylene is also acceptable for outer layer 208.

Intermediate layer 210 is preferably an expanded polytetrafluoroethylene (PTFE) (Teflon®) particulate filtration layer. Any filter medium, however, which permits the diffusion of gases/vapors and reasonably deters submicron particulate of the sorbent from escaping the pouch can be used for intermediate layer 210.

Inner layer 212 is preferably a spunbond non-woven material with a melting temperature higher than that of the second layer. Examples of acceptable fabrics for inner layer 212 include Filtration Sciences REEMAY® or HOLLYTEX® non-woven spunbond polyester. Basis weights are preferably greater than approximately 0.5 oz/sq yd.

Third layer 204 need not be identical to first layer 202, but functionally equivalent to first layer 202. That is, third layer 204 preferably has two scrim layers disposed on opposite sides of a particulate filtration layer, the inner scrim layer being capable of receiving reflow of second layer 206 to form a mechanically sound joint.

Second layer 206 is preferably a spunbond non-woven fabric having a melting temperature less than that of inner layer 212 of first layer 202 and third layer 204. An example of an acceptable second layer 206 is Scott Non-Woven 6724-0 Polypropylene. Basis weight is greater than 0.8 oz/sq yd, preferably approximately 1.0 oz/sq yd. The basis weight of second layer 206 must be high enough to allow sufficient reflow of molten material into the matrix of inner layers 212 of first layer 202 and third layer 204 to form an edge seal joint 214 having the desired mechanical strength. Ultrasonic welding is the preferred technique for reflowing second layer 206 into inner layers 212 to form joint 214, however, other acceptable welding techniques are well known to those of skill in the art.

Figure 9:
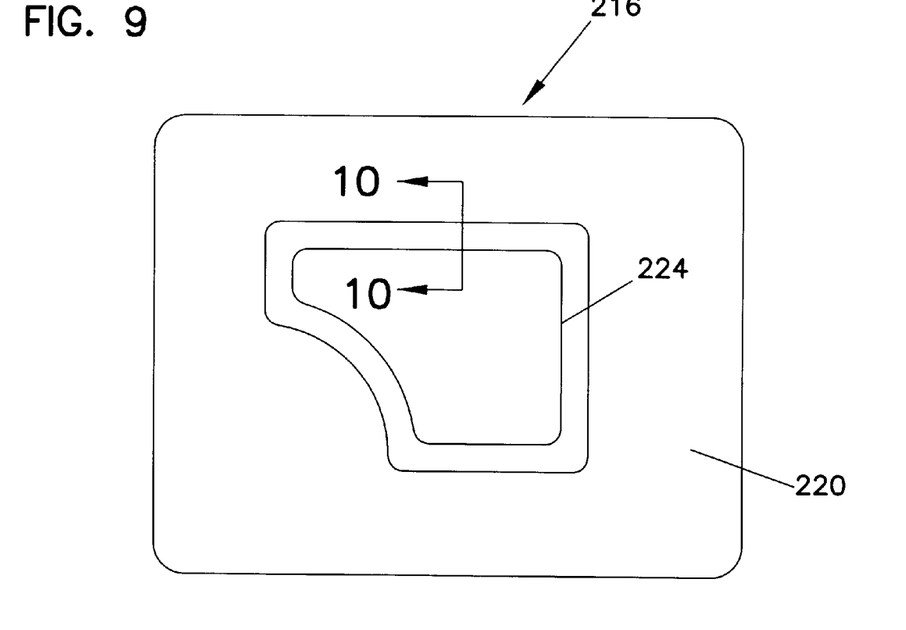
FIG. 9 is a filter pouch containing a desiccant in accordance with the present invention.
Figure 10:
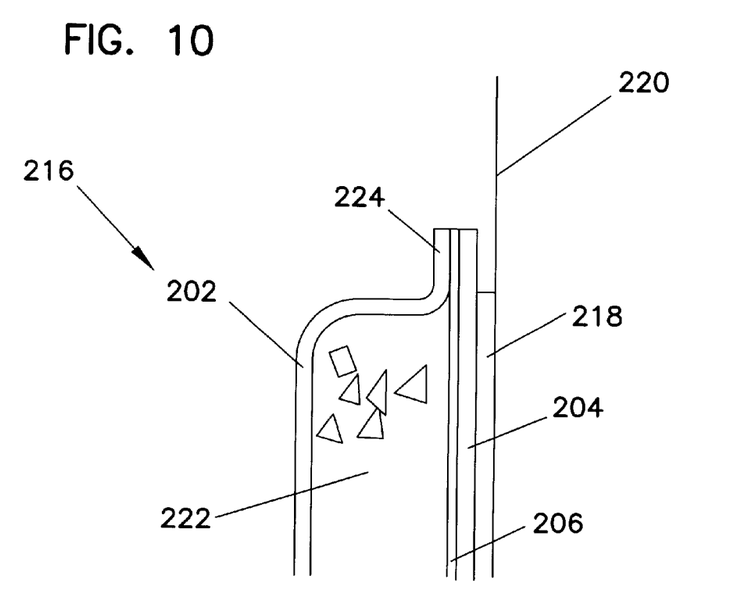
FIG. 10 is a cross-sectional view of the filter pouch containing desiccant from FIG. 9.

FIGS. 9 and 10 show a filter pouch 216 used to contain a desiccant such as silica gel to form a desiccant pouch. Such a desiccant pouch can be used to control relative humidity of the enclosures of hard disk drives and other sensitive equipment.

As shown in FIGS. 9 and 10, the pouch may include a means for adhesively mounting the pouch in a disk drive compartment or other space. The means for mounting include an adhesive layer 218 and Mylar release liner 220.

FIG. 9 shows that, like filter pouch 200, desiccant pouch 216 includes the same first, second and third filter layers 202, 206, and 204, respectively, but rather than having a carbon filter 40 disposed between first layer 202 and third filter layer 204, a desiccant material 222, such as silica gel, is used. When manufacturing desiccant pouch 216, first layer 202 is preferably formed into a cup-like recess and filled with desiccant material 222. Second layer 206 and third layer 204 are then placed adjacent first layer 202 and desiccant material 222, as shewn in FIG. 9, and welded at edge 224 by one of the techniques described above with respect to edge 214.

It is to be understood that even though numerous characteristics and advantages of the present invention have been set forth in the foregoing description, together with details of the structure and function of the invention, this disclosure is illustrative only, and changes may be made in detail, especially in matters of shape, size and arrangement of the filters within the principles of the invention, to the full extent indicated by the broad general meaning of the terms in which the appended claims are expressed.

What is claimed is:

1. A filter comprising:
    a) a layer of carbon cloth having two major sides and an edge formed by fracturing the carbon cloth;
    b) a layer of filter material on each of the two major sides of the carbon cloth, the layers of filter material overlapping around the edge and encapsulating the layer of carbon cloth;
    c) an additional strip of filter material on outer face of each layer of filter material and extending only along a periphery of the layers of filter material; and
    d) wherein the edge of the layers of filter material and the strips of filter material are welded together to provide a welded filter edge coextensive along the carbon cloth edge, the filter edge being substantially free of particles from the carbon cloth layer.

2. The filter of claim 1, wherein the carbon cloth further comprises carbonized, activated, woven fabric.

3. The filter of claim 1, wherein the layers of filter material and the strips of filter material comprise materials having substantially similar melting points.

4. The filter of claim 1, wherein the layers of filter material further comprise a non-woven fabric comprised of material chosen from the group consisting of polypropylene, polycarbonate and polyester.

5. A filter pouch, the pouch comprising:
    a) a first layer, being a 3-layer composite and having two major sides, the first layer including an intermediate particulate filtration layer, an outer scrim layer being disposed on and bonded to one side of the particulate filtration layer, and an inner scrim layer being disposed on and bonded to the opposite side of the particulate filtration layer, the inner scrim layer having a spunbond, non-woven matrix;
    b) a second layer of spunbond, non-woven material; and
    c) a third layer having two major sides and an outer scrim layer, intermediate particulate filtration layer, and an inner scrim layer being arranged in the same configuration as the outer layer, intermediate layer, and inner layer of the first layer, respectively, the inner layer of the first layer being disposed toward the inner layer of the third layer and the second layer being disposed between the inner layers, the second layer having a melting temperature less than the inner layers so that the first, second and third layers can be welded together proximate their edges to form a pouch by melting the second layer into the spunbond, non-woven matrix of the inner layers.

6. The filter pouch in accordance with claim 5, wherein the intermediate layers are expanded polytetrafluoroethylene (PTFE).

7. The filter pouch in accordance with claim 5, wherein the outer layers are extruded polymeric non-woven fabric.

8. The filter pouch in accordance with claim 5, wherein the inner layers are spunbond non-woven polyester having a basis weight greater than 0.5 oz/sq yd.

9. The filter pouch in accordance with claim 5, wherein the second layer is spunbond, non-woven polypropylene.

10. The filter pouch in accordance with claim 9, wherein the polypropylene has a basis weight of greater than 0.8 oz/sq yd.

11. The filter pouch in accordance with claim 5, wherein a desiccant material is disposed within the pouch between the first and third layers.

12. The filter pouch in accordance with claim 11, wherein the desiccant material is silica gel.

13. The filter pouch in accordance with claim 5, wherein a carbon filter is disposed within the pouch between the first and third-layers.

14. The filter pouch in accordance with claim 13, wherein the carbon filter includes a layer of carbon cloth.

15. A filter pouch, comprising:

a) a filter including a carbon cloth having an upper face and a lower face, filter material covering the upper face and lower face;

b) a pouch encapsulating the filter, including:

an outer layer having a particulate filtration band and a support band on each face of the particulate filtration band;

an inner layer having a particulate filtration band and a support band on each face of the particulate filtration band;

an intermediate layer disposed between the inner and outer layers having a melting temperature less than the support bands proximate the intermediate layer; and, c) a joint sealing the pouch layers around the filter and encapsulating the filter.

* * * * *